United States Patent
Hirata et al.

[15] 3,669,862
[45] June 13, 1972

[54] DEVICE FOR MEASURING AN ACTIVITY OF CUPRIC IONS

[72] Inventors: Hiroshi Hirata; Masanao Arai, both of Osaka, Japan

[73] Assignee: Matsushita Electric Industrial Co., Ltd., Osaka, Japan

[22] Filed: April 13, 1970

[21] Appl. No.: 27,476

[30] Foreign Application Priority Data
April 20, 1969 Japan..................................44/30419
April 20, 1969 Japan..................................44/30420

[52] U.S. Cl.....................................................204/195 M
[51] Int. Cl. ..............................................................G01n 27/46
[58] Field of Search ..........................204/1 T, 195 R, 195 M

[56] References Cited
FOREIGN PATENTS OR APPLICATIONS
763,082   7/1967   Canada..................................204/195

OTHER PUBLICATIONS
Noddack et al., " Z. fur Elektrochemie," Vol. 59, No. 2, 1955, pp. 96–102

Primary Examiner—T. Tung
Attorney—Wenderoth, Lind & Ponack

[57] ABSTRACT

A device for measuring an activity of cupric ions comprises a selective electrode and a reference electrode immersed in a solution containing cupric ions, said selective electrode including a cuprous sulfide sintered plate having a lead connected to one surface thereof, whereby only another surface contacts with said solution.

5 Claims, 2 Drawing Figures

INVENTORS
HIROSHI HIRATA
MASANAO ARAI

BY Wenderoth, Lind & Ponack
ATTORNEYS

DEVICE FOR MEASURING AN ACTIVITY OF CUPRIC IONS

BACKGROUND OF THE INVENTION

The invention relates to a device for measuring the activity of cupric ions and more particularly to a device comprising a selective electrode responsive to the activity of cupric ions and a reference electrode.

Cupric ion activity can be determined by several methods such as chelatometric titration, iodometry, spectrophotography and polarography. However, these methods generally require troublesome pretreatment for the sample before the measurement of cupric ions.

It is desirable for chemical industry to have a device for measuring the activity of cupric ions in a solution without any troublesome pretreatment similar to that of a pH glass electrode for measuring the pH value of a solution without any pretreatment of the solution to be tested.

An object of this invention is to provide a device for measuring directly the activity of cupric ions in a solution.

A further object of this invention is to provide such a measuring device characterized by a high sensitivity to cupric ions.

Another object of this invention is to provide a cupric ion measuring device characterized by a high response to the cupric ions.

These and other objects of this invention will be apparent upon consideration of the following detailed description taken together with accompanying drawings.

A device for measuring the activity of cupric ions according to the present invention comprises a selective electrode and a reference electrode immersed in a solution containing cupric ions, said selective electrode including a cuprous sulfide sintered plate having a lead connected to one surface thereof, whereby only another surface contacts with said solution.

Figure 1:
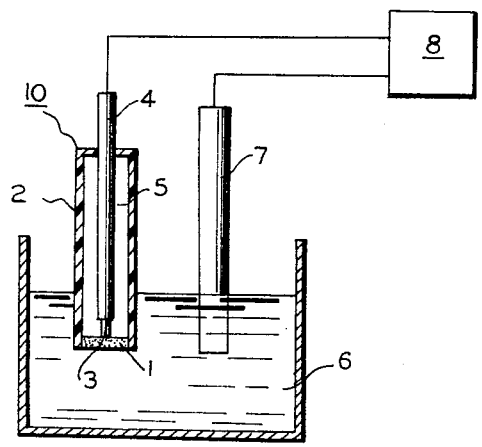
FIG. 1 is a schematic diagram of a device for measuring cupric ions in a solution in accordance with the invention.

Referring to FIG. 1, reference character 10 designates, as a whole, a selective electrode, comprising a cuprous sulfide sintered plate 1 and a lead 3 connected to one surface of said sintered plate 1. Said lead 3 is enveloped by a sealed wire 4. A combination of said sintered plate 1 and said lead 3 partly enveloped by said sealed wire 4 is enclosed in a housing 2 so that another surface of said sintered plate 1 contacts with a solution 6. Said housing 2 is filled with an insulating resinous material 5. A reference electrode 7 partly immersed in said solution 6 is electrically connected to one terminal of a voltmeter 8 having a high impedance. Said lead 3 is electrically connected to another terminal of said voltmeter 8.

A variation in the logarithm of the activity of cupric ions in said solution 6 has a substantially linear relation to the variation in the potential between said selective electrode 10 and said reference electrode 7, both being partly immersed in said solution 6. One can use any available and suitable electrode such as a saturated calomel electrode or a silver chloride electrode as said reference electrode 7.

Said cuprous sulfide sintered plate 1 is of a composition consisting essentially of cuprous sulfide. The use of cupric sulfide for said sintered body does not achieve a high sensitivity and a high response to a measurement of cupric ions in said solution 6.

Although cuprous sulfide exists in various phases, any of the phases, chalcocite, djurleite and digenite are operable. Among those three phases, the djurleite phase is characterized by a high response to the measurement of cupric ions; and the digenite is characterized by a high sensitivity to cupric ions in the solution. In view of the response and the sensitivity, best results can be obtained with a mixture of the djurleite and the digenite. A preferable mixing ratio ranges from 3:1 to 1:4 in the diffracted line intensity ratio of an X-ray diffractometric pattern of the djurleite at $2\theta = 48.5°$ to the digenite at $2\theta = 32.4°$.

The X-ray diffractometric pattern referred to herein is obtained by using a $CuK\alpha$ line and a nickel filter with the excitation condition of 35 $kV_p$ and 15 mA.

Figure 2:
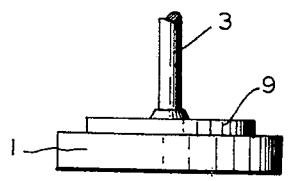
FIG. 2 is a cross sectional view of a cuprous sulfide sintered plate for use in the device of FIG. 1.

A longer operation life can be obtained by providing said cuprous sulfide sintered plate with a noble metal electrode such as a gold, paladium or platinum electrode. Referring to FIG. 2, a cuprous sulfide sintered plate 1 has a noble metal electrode 9 applied to one surface thereof. A lead 3 is electrically connected to said noble metal electrode 9 by any available and suitable method such as soldering. Said noble metal electrode 9 can be prepared by, for example, vacuum-depositing of a noble metal film or by applying a avilable commercially noble metal paint.

The cuprous sulfide sintered plate can be obtained by heating a pressed body of cuprous sulfide powder in a nonoxidizing atmosphere in accordance with a conventional ceramic method. The phase composition of the cuprous sulfide sintered plate is controlled by heating the atmosphere during the heating process at a temperature of 500° to 900° C. for a time period of 1 to 5 hours. The use of nitrogen gas results in a sintered plate containing, as a major part, the djurleite phase. The use of hydrogen sulfide gas or gaseous sulfur results in a sintered plate containing, as a major part, the digenite phase. The use of a mixture of hydrogen sulfide gas and nitrogen gas results in a sintered plate containing a mixture of the djurleite phase and a digenite phase.

After being cooled, the sintered plate is polished, at both surfaces, and washed with a supersonic wave cleaner.

The choice of the starting cuprous sulfide has a significant effect on the cuprous sulfide sintered plate. In connection with the stability, sensitivity and/or response, the best results can be obtained by using starting cuprous sulfide which is formed as follows: A fine powder of cuprous sulfide is obtained by heating a mixture of copper powder and sulfur in a molar ratio of 2:1 at 600° C. for 2 hours in an atmosphere of hydrogen sulfide and by grinding the mixture to particles of less than $10\mu$.

The device according to the invention can be reliably used at temperatures from 0° to 80° C. The measured potential versus the logarithm of the activity of cupric ions is in a substantially linear relation.

Many kinds of diverse ions such as sodium, potassium, calcium, magnesium, nickel, lead, cobaltic, aluminum, zinc, ferrous, chloride, bromide, sulfate and perchlorate ions are tolerated and may coexist during the measurement of the activity of the cupric ions. However, ferric, silver, mercuric, ammonium, iodide and sulfide ions should be removed from the solution to be measured.

EXAMPLE 1

A cuprous sulfide power prepared by a method similar to that described above is pressed at a pressure of 150 kg/cm² into a disc 15 mm in diameter and having a 3 mm thickness. The pressed disc is heated at 700° C. for 2 hours in nitrogen gas having a flow rate of 0.2 l/min. The sintered disc is polished, at both surfaces, with silicon carbide abrasive and then with diamond paste into a thickness of 2 mm. The sintered disc includes, as a major part, the djurleite phase. The polished disc is provided, at one surface, with a gold electrode which is obtained from Dupont gold paint No. 8115. The polished disc is connected, at the gold electrode, to a lead partly enveloped by a sealed wire and is mounted in a housing of polyvinyl chloride resin. The housing is filled with epoxy resin so as to build a selective electrode as shown in FIG. 1. A combination of the selective electrode and a saturated calomel electrode as a reference electrode is immersed in an aqueous solution of pure cupric sulfate at 25° C. The potential between the selective electrode and the calomel electrode is measured by a voltmeter for use in a pH meter.

The device measures the activity of cupric ions with a high response as shown in Table 1.

TABLE 1

| Activity of cupric ion, M | Potential mV | Response time sec. |
|---|---|---|
| $3.2 \times 10^{-2}$ | 147 | <5 |
| $5.5 \times 10^{3}$ | 128 | <5 |
| $8.0 \times 10^{4}$ | 107 | <5 |
| $9.2 \times 10^{5}$ | 81 | <5 |
| $10^{-5}$ | 51 | 15 |
| $10^{-6}$ | 21 | 20 |
| $10^{-7}$ | 5 | 60 |
| $10^{-8}$ | 0 | 100 |

EXAMPLE 2

A device for measuring the activity of cupric ions is prepared in a manner similar to that of Example 1. A cuprous sulfide sintered plate of Example 2 includes the digenite phase as a major part. The preparation of the cuprous sulfide sintered plate is similar to that of Example 1 except for use of a hydrogen sulfide gas instead of nitrogen gas. The potential between the selective electrode and the calomel electrode in the aqueous solution of pure cupric sulfate is measured with the same procedure described in Example 1. The device measures the activity of cupric ions with a high sensitivity as shown in Table 2.

TABLE 2

| Activity of cupric ion, M | Potential mV | Response time, sec. |
|---|---|---|
| $3.2 \times 10^{2}$ | 173 | 15 |
| $5.5 \times 10^{3}$ | 155 | 15 |
| $8.0 \times 10^{4}$ | 134 | 15 |
| $9.2 \times ^{-5}$ | 108 | 30 |
| $10^{-5}$ | 79 | 45 |
| $10^{-6}$ | 45 | 120 |
| $10^{-7}$ | 16 | 240 |
| $10^{-8}$ | 4 | 300 |

EXAMPLE 3

The device for measuring the activity of cupric ions is prepared in a manner similar to that of Example 1. A cuprous sulfide sintered plate of Example 3 is in a composition of a mixture of the two phases, djurleite and digenite. The preparation of the cuprous sulfide sintered disc is similar to that of Example 1 except for use of the mixture of hydrogen sulfide and nitrogen gases having flow rates of 0.1 l/min and 0.1 l/min, respectively, instead of nitrogen gas in a flow rate of 0.2 ./min. The X-ray diffracted line intensity ratio defined above is 3:2= djurleite:digenite. The potential between the selective electrode and the satulated calomel electrode in an aqueous solution of pure cupric sulfate is measured by the same procedure described in Example 1.

TABLE 3

| Activity of cupric ion, M | Potential mV | Response time, sec. |
|---|---|---|
| $3.2 \times 10^{2}$ | 164 | <5 |
| $5.5 \times 10^{3}$ | 144 | 5 |
| $8.0 \times 10^{4}$ | 121 | 5 |
| $9.2 \times 10^{5}$ | 94 | 10 |
| $10^{-5}$ | 65 | 15 |
| $10^{-6}$ | 34 | 25 |
| $10^{-7}$ | 14 | 60 |
| $10^{-8}$ | 2 | 120 |

EXAMPLE 4

A device for measuring the activity of cupric ions is prepared in a manner similar to that of Examples 1. The cuprous sulfide sintered plate of Example 4 is a composition of the chalcocite phase as a major part. The preparation of the cuprous sulfide is similar to that of Example 1, except for use of the pressed disc in a carbon crucible in an atmosphere of nitrogen gas. The potential between the selective electrode and the calomel electrode in the aqueous solution of pure cupric sulfate is measured with the same procedure described in Example 1. The device measures the activity of cupric ions with an acceptable sensitivity as shown in Table 4.

TABLE 4

| Activity of cupric ion, M | Potential, mV | Response time, sec. |
|---|---|---|
| $3.2 \times 10^{2}$ | 134 | 5 |
| $5.5 \times 10^{3}$ | 116 | 5 |
| $8.0 \times 10^{4}$ | 95 | 10 |
| $9.2 \times 10^{5}$ | 68 | 15 |
| $10^{-5}$ | 40 | 25 |
| $10^{-6}$ | 13 | 45 |
| $10^{-7}$ | 2 | 120 |
| $10^{-8}$ | −1 | 200 |

What is claimed is:

1. A device for measuring an activity of cupric ions comprising a selective electrode and a reference electrode, said selective electrode including a cuprous sulfide sintered plate of a composition consisting essentially of a phase selected from the group consisting of djurleite and digenite, said plate having a lead connected to one surface thereof, whereby only another surface contacts with said solution.

2. A device for measuring an activity of cupric ions as defined in claim 1, wherein said cuprous sulfide sintered plate is of a composition consisting essentially of djurleite.

3. A device for measuring an activity of cupric ions as defined in claim 1, wherein said cuprous sulfide sintered plate is of a composition consisting essentially of digenite.

4. A device for measuring an activity of cupric ions as defined in claim 1, wherein said cuprous sulfide sintered plate has a noble metal electrode applied to one surface thereof, whereby said lead is connected to said noble metal electrode.

5. A device for measuring an activity of cupric ions comprising a selective electrode and a reference electrode, said selective electrode including a cuprous sulfide sintered plate of a composition consisting essentially of the two phases of djurleite and digenite, the X-ray intensity ratio of said djurleite to digenite ranging from 3:1 to 1:4.

* * * * *